United States Patent
Asahara (10) Patent No.: US 9,147,227 B2
(45) Date of Patent: Sep. 29, 2015

(54) RGB COLOR PIXEL INTERPOLATING DEVICE AND METHOD

(71) Applicant: JVC KENWOOD Corporation, Yokohama-shi (JP)

(72) Inventor: Shuichi Asahara, Kawasaki (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 0 days.

(21) Appl. No.: 14/246,557

(22) Filed: Apr. 7, 2014

(65) Prior Publication Data

US 2014/0355876 A1 Dec. 4, 2014

(30) Foreign Application Priority Data

May 30, 2013 (JP) .................. 2013-113725

(51) Int. Cl.
G06K 9/00 (2006.01)
G06T 3/40 (2006.01)
G06T 7/40 (2006.01)

(52) U.S. Cl.
CPC ............... G06T 3/4015 (2013.01); *G06T 3/403* (2013.01); *G06T 3/4007* (2013.01); *G06T 7/408* (2013.01); *H04N 2209/046* (2013.01)

(58) Field of Classification Search
CPC ..... G06T 7/408; G06T 3/4007; G06T 3/4015; G06T 3/403; H04N 2209/046
See application file for complete search history.

(56) References Cited

U.S. PATENT DOCUMENTS 5,629,734 A 5/1997 Hamilton, Jr. et al.

FOREIGN PATENT DOCUMENTS

JP 2012/099903 5/2012

OTHER PUBLICATIONS

Ramanath et al., "Demosaicking methods for Bayer color arrays", Jul. 1, 2002, Journal of Electronic Imaging, vol. 11, iss. 3, p. 306-315.*
Gunturk et al., "Demosaicking: Color Filter Array Interpolation", Jan. 2005, IEEE Signal Processing Magazine, p. 44-54.*

* cited by examiner

*Primary Examiner* — Bhavesh Mehta
*Assistant Examiner* — Timothy Choi
(74) *Attorney, Agent, or Firm* — Nath, Goldberg & Meyer; Jerald L. Meyer; Stanley N. Protigal (57) ABSTRACT

A G interpolation method selector and an R/B interpolation method selector decide between a first case, which is not a monotonous increase or a monotonous decrease of pixel signals of three pixels in reference pixel signals used for producing an interpolation pixel signal, and a second case, which is the monotonous increase or the monotonous decrease. A G interpolation unit produces an interpolation pixel signal of G in such a manner as to change interpolation methods depending on the first case or the second case. An R/B interpolation unit produces an interpolation pixel signal of R or B in such a manner as to change interpolation methods depending on the first case or the second case.

4 Claims, 9 Drawing Sheets

| R | Gr | R | Gr | R | Gr |
|---|----|---|----|---|----|
| Gb | B | Gb | B | Gb | B |
| R | Gr | R | Gr | R | Gr |
| Gb | B | Gb | B | Gb | B |
| R | Gr | R | Gr | R | Gr |
| Gb | B | Gb | B | Gb | B |

FIG. 15A CASE 1

FIG. 15B CASE 1

FIG. 15C CASE 2

FIG. 15D CASE 2

FIG. 16

RGB COLOR PIXEL INTERPOLATING DEVICE AND METHOD

CROSS REFERENCE TO RELATED APPLICATION

This application is based upon and claims the benefit of priority under 35 U.S.C.§119 from Japanese Patent Application No. 2013-113725, filed on May 30, 2013, the entire contents of which are incorporated herein by reference.

BACKGROUND

The present disclosure relates to an image signal processing device and method for performing interpolation of pixel signals of three primary colors output from an imaging device including a color filter of a Bayer array.

A pixel signal of each of three primary colors output from an imaging device including a color filter of a Bayer array is only one of pixel signals of R (red), G (green) and B (blue) per pixel.

Pixel signals of two colors other than a pixel which is output as a pixel signal among three pixels are required to be produced by interpolation processing. Processing for producing pixel signals which are not output as pixel signals by interpolation processing is called demosaicing.

An example of the easiest method of demosaicing is a bilinear method for performing linear interpolation using pixel signals of peripheral colors which are the same as a color to be produced by interpolation.

However, the interpolation processing by the bilinear method is not used in general because the method has the disadvantages of, for example, causing false colors at edges of images because of incorrect interpolation and causing great deterioration in resolution.

There is known an adaptive color plane interpolation (ACPI) method commonly used for resolving the disadvantages of the bilinear method. The ACPI method is used for performing interpolation of a pixel signal with reference to pixel signals of colors different from a color to be produced by the interpolation.

U.S. Pat. No. 5,629,734 (Patent Literature 1) discloses interpolation processing by the ACPI method. Japanese Unexamined Patent Application Publication No. 2012-099903 (Patent Literature 2) discloses interpolation processing by a method obtained by improving the ACPI method.

SUMMARY

The interpolation processing by the ACPI method is a means of performing interpolation of a pixel signal of a color with reference to pixel signals of other colors. Therefore, the interpolation processing by the ACPI method can accurately obtain edge information of an image so as to obtain an interpolation image with relatively high resolution in which false colors hardly occur.

However, edge information at an edge portion of adjacent two colors having a complementary color relationship cannot be obtained accurately and therefore errors increase if, for example, a pixel signal of R decreases while pixel signals of G and B increase when crossing a boundary between edges. As a result, an increase in magnitude of false noise may be caused or edges in an oblique direction may be jagged.

In view of such a problem, an image signal processing device and method capable of obtaining interpolation images with higher quality than those obtained by an ACPI method, are required.

It is an object of embodiments to provide an image signal processing device and method capable of obtaining interpolation images with high resolution and high quality in which false colors, false noises or jagged oblique edges hardly occur.

In order to solve the conventional problems described above, a first aspect of the embodiments provides an image signal processing device including: a first determination unit configured to, when pixel signals of three pixels in reference pixel signals of R or B used for producing an interpolation pixel signal of G in a pixel position of a pixel signal of R or B where a pixel signal of G is not present in pixel signals of R, G and B output from an imaging device including a color filter of a Bayer array, are defined as first to third R/B pixel signals in order of time, decide between a first case and a second case, the first case indicating a change including an increase from the first R/B pixel signal to the second R/B pixel signal and a decrease from the second R/B pixel signal to the third R/B pixel signal or a change including a decrease from the first R/B pixel signal to the second R/B pixel signal and an increase from the second R/B pixel signal to the third R/B pixel signal, the second case indicating a monotonous increase or a monotonous decrease of the first to third R/B pixel signals; a G interpolation unit configured to, when three pixel signals including the interpolation pixel signal of G and two pixel signals of G interposing the interpolation pixel signal of G therebetween are defined as first to third G pixel signals in order of time, produce the interpolation pixel signal of G in such a manner as to add, to an average value of the first G pixel signal and the third G pixel signal, a value obtained by multiplying a difference between the second R/B pixel signal and an average value of the first R/B pixel signal and the third R/B pixel signal by a ratio of a distance between the first G pixel signal and the third G pixel signal to a distance between the first R/B pixel signal and the third R/B pixel signal when the first determination unit selects the first case, and produce the interpolation pixel signal of G in a manner such that a shape obtained by connecting each pixel position of the first, second and third R/B pixel signals resembles a shape obtained by connecting each pixel position of the first, second and third G pixel signals when the first determination unit selects the second case; a second determination unit configured to, when pixel signals of three pixels in reference pixel signals of G or reference interpolation pixel signals of G used for producing an interpolation pixel signal of R or B in each of a pixel position of a pixel signal of G where pixel signals of R and B are not present, a pixel position of a pixel signal of R where a pixel signal of B is not present, and a pixel position of a pixel signal of B where a pixel signal of R is not present in the pixel signals of R, G and B output from the imaging device, are defined as fourth to sixth G pixel signals in order of time, decide between the first case and the second case, the first case indicating a change including an increase from the fourth G pixel signal to the fifth G pixel signal and a decrease from the fifth G pixel signal to the sixth G pixel signal or a change including a decrease from the fourth G pixel signal to the fifth G pixel signal and an increase from the fifth G pixel signal to the sixth G pixel signal, the second case indicating a monotonous increase or a monotonous decrease of the fourth to sixth G pixel signals; and an R/B interpolation unit configured to, when three pixel signals including the interpolation pixel signal of R or B and two pixel signals of R or B interposing the interpolation pixel signal of R or B therebetween are defined as fourth to sixth R/B pixel signals in order of time, produce the interpolation pixel signal of R or B in such a manner as to add a difference between the fifth G pixel signal and an average value of the fourth G pixel signal and the sixth G pixel signal to an average value of the fourth R/B pixel signal and the sixth R/B pixel signal when the second determination unit selects the first case, and produce the interpolation pixel signal of R or B in a manner such that a shape obtained by connecting each pixel position of the fourth, fifth and sixth G pixel signals resembles a shape obtained by connecting each pixel position of the fourth, fifth and sixth R/B pixel signals when the second determination unit selects the second case.

A second aspect of the embodiment provides an image signal processing method including: when pixel signals of three pixels in reference pixel signals of R or B used for producing an interpolation pixel signal of G in a pixel position of a pixel signal of R or B where a pixel signal of G is not present in pixel signals of R, G and B output from an imaging device including a color filter of a Bayer array, are defined as first to third R/B pixel signals in order of time, deciding between a first case and a second case, the first case indicating a change including an increase from the first R/B pixel signal to the second R/B pixel signal and a decrease from the second R/B pixel signal to the third R/B pixel signal or a change including a decrease from the first R/B pixel signal to the second R/B pixel signal and an increase from the second R/B pixel signal to the third R/B pixel signal, the second case indicating a monotonous increase or a monotonous decrease of the first to third R/B pixel signal; when three pixel signals including the interpolation pixel signal of G and two pixel signals of G interposing the interpolation pixel signal of G therebetween are defined as first to third G pixel signals in order of time, producing the interpolation pixel signal of G in such a manner as to add, to an average value of the first G pixel signal and the third G pixel signal, a value obtained by multiplying a difference between the second R/B pixel signal and an average value of the first R/B pixel signal and the third R/B pixel signal by a ratio of a distance between the first G pixel signal and the third G pixel signal to a distance between the first R/B pixel signal and the third R/B pixel signal when the first case the first case is selected; producing the interpolation pixel signal of G in a manner such that a shape obtained by connecting each pixel position of the first, second and third R/B pixel signals resembles a shape obtained by connecting each pixel position of the first, second and third G pixel signals when the second case is selected; when pixel signals of three pixels in reference pixel signals of G or reference interpolation pixel signals of G used for producing an interpolation pixel signal of R or G in each of a pixel position of a pixel signal of G where pixel signals of R and B are not present, a pixel position of a pixel signal of R where a pixel signal of B is not present, and a pixel position of a pixel signal of B where a pixel signal of R is not present in the pixel signals of R, G and B output from the imaging device, are defined as fourth to sixth G pixel signals in order of time, deciding between the first case and the second case, the first case indicating a change including an increase from the fourth G pixel signal to the fifth G pixel signal and a decrease from the fifth G pixel signal to the sixth G pixel signal or a change including a decrease from the fourth G pixel signal to the fifth G pixel signal and an increase from the fifth G pixel signal to the sixth G pixel signal, the second case indicating a monotonous increase or a monotonous decrease of the fourth to sixth G pixel signals; when three pixel signals including the interpolation pixel signal of R or B and two pixel signals of R or B interposing the interpolation pixel signal of R or B therebetween are defined as fourth to sixth R/B pixel signals in order of time, producing the interpolation pixel signal of R or B in such a manner as to add a difference between the fifth G pixel signal and an average value of the fourth G pixel signal and the sixth G pixel signal to an average value of the fourth R/B pixel signal and the sixth R/B pixel signal when the first case is selected; and producing the interpolation pixel signal of R or B in a manner such that a shape obtained by connecting each pixel position of the fourth, fifth and sixth G pixel signals resembles a shape obtained by connecting each pixel position of the fourth, fifth and sixth R/B pixel signals when the second case is selected.

DETAILED DESCRIPTION

Hereinafter, an image signal processing device and method according to embodiments will be explained with reference to the accompanying drawings.

Figure 1:
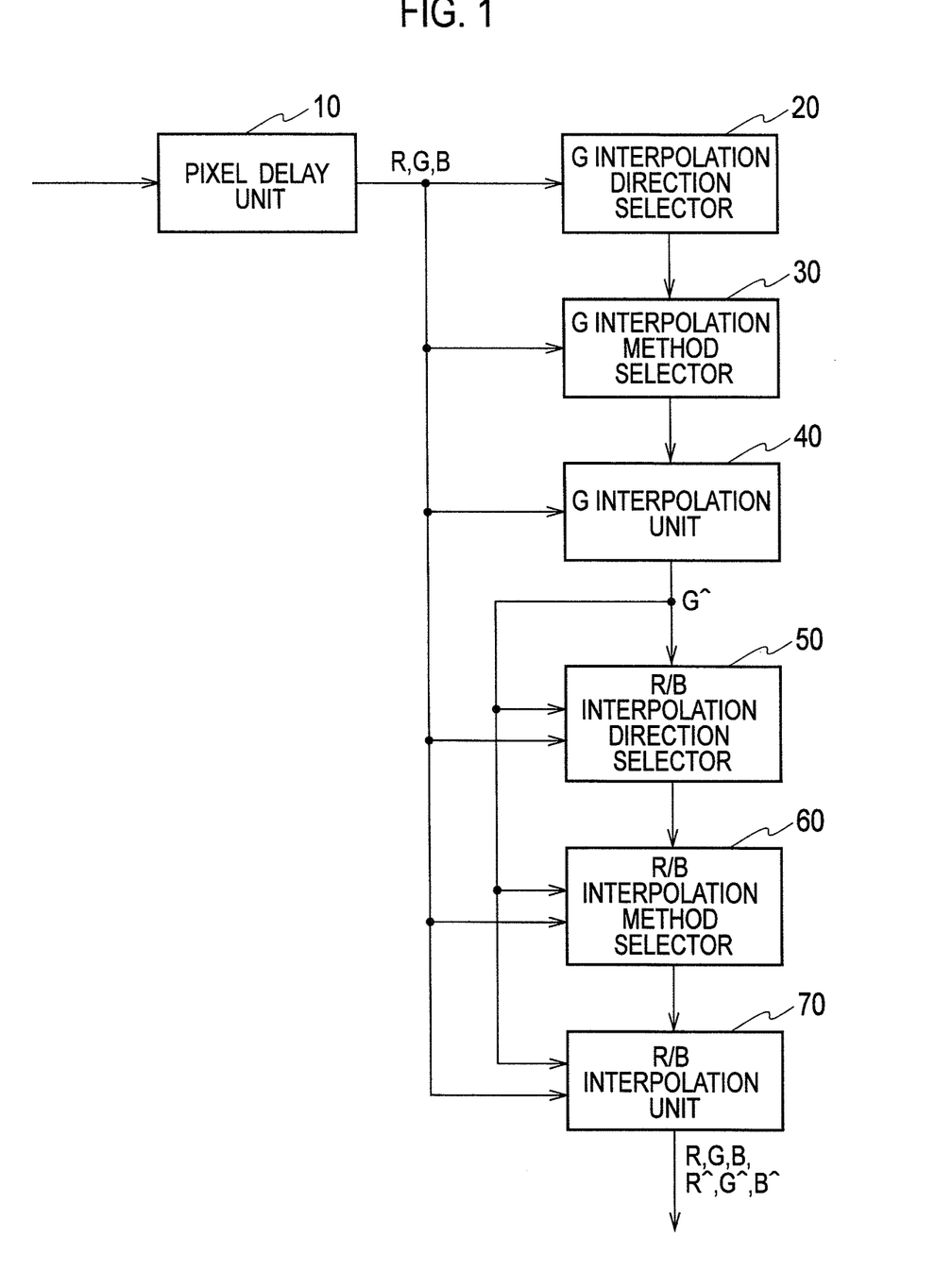
FIG. 1 is a block diagram showing an image signal processing device according to at least one embodiment.

As shown in FIG. 1, pixel signals of each color output from a single-plate imaging device including a color filter of a Bayer array and subjected to predetermined signal processing such as A/D conversion, are sequentially input into a pixel delay unit 10.

Figure 2:
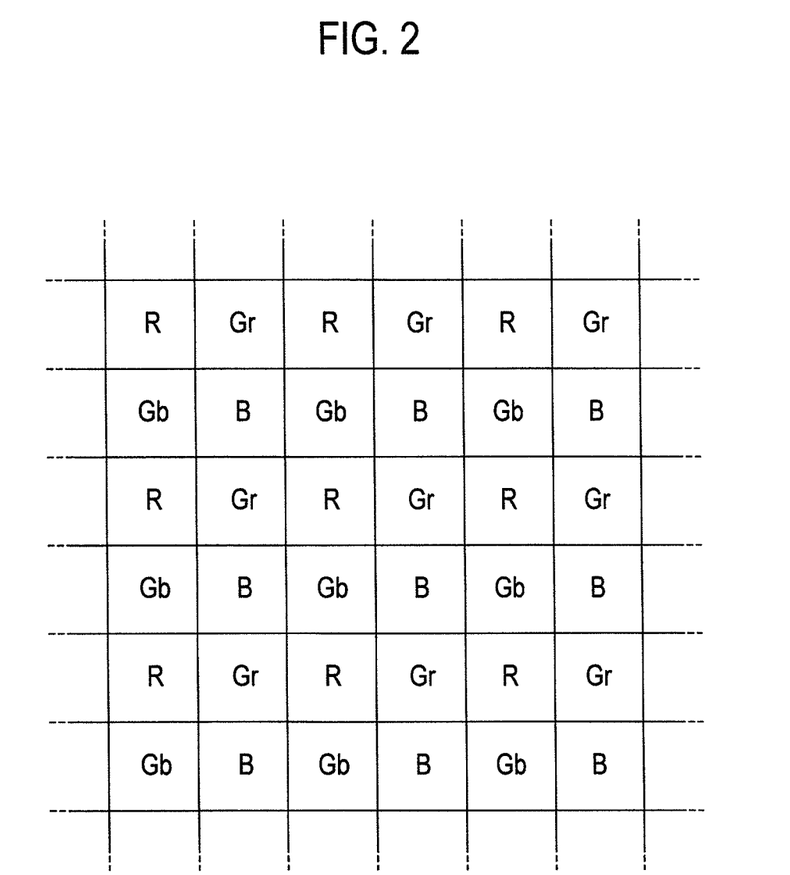
FIG. 2 is a view showing a pixel array of an imaging device including a color filter of a Bayer array.

The imaging device including the color filter of a Bayer array has a pixel array as shown in FIG. 2. The pixel array shown in FIG. 2 includes first lines in which R pixels and G pixels are arranged alternatively in the horizontal direction and second lines in which B pixels and G pixels are arranged alternatively in the horizontal direction, the first lines and the second lines being arranged alternatively in the vertical direction. The G pixels in the first lines are indicated by Gr and the G pixels in the second lines are indicated by Gb.

The pixel delay unit 10 delays the input pixel signals in the horizontal direction and in the vertical direction so as to output pixel signals necessary in each of the circuit blocks from a G interpolation direction selector 20 to an R/B interpolation unit 70. The pixel delay unit 10 may include a plurality of line memories and a plurality of pixel delay devices.

First, the image signal processing device and method according to the embodiment produces an interpolation pixel signal of G in a pixel position where no G pixel is present through the circuit blocks from the G interpolation direction selector 20 to the G interpolation unit 40 as shown in FIG. 1. Reference symbol Gˆ represents an interpolation pixel signal of G.

Next, the image signal processing device and method according to the embodiment produces an interpolation pixel signal of R or B in a pixel position where no R/B pixel is present through the circuit blocks from the R/B interpolation direction selector 50 to the R/B interpolation unit 70. Reference symbols Rˆ and Bˆ represent interpolation pixel signals of R and B, respectively.

Accordingly, the interpolation pixel signals of two colors, among the pixel signals of R, G and B, other than the present pixel signal output from the imaging device are produced. The pixel signals of the three colors present in each of the pixel positions are output from the R/B interpolation unit 70.

The image signal processing device and method according to the embodiment is based on interpolation of pixel signals by an ACPI method. The following is an explanation of interpolation processing of pixel signals by the ACPI method.

As described below, the G interpolation unit 40 produces interpolation pixel signals of G in each of the pixel position of R and the pixel position of B. The G interpolation direction selector 20 detects a direction having a larger correlation to select an interpolation direction so that the G interpolation unit 40 can perform interpolation of the pixel signals of G while avoiding incorrect interpolation.

Figure 3A:
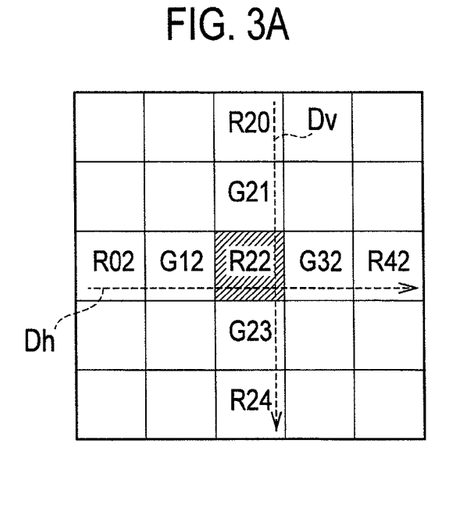
FIG. 3A is a view showing pixel signals of R, G and B used for performing interpolation of a pixel signal of G in a position of a pixel signal of R.

As shown in FIG. 3A, the G interpolation direction selector 20 determines whether a horizontal direction Dh or a vertical direction Dv has a larger correlation so that the G interpolation unit 40 produces the interpolation pixel signal of G in the pixel position of R indicated by R22. When the amount of change in the horizontal direction Dh is defined as Ch and the amount of change in the vertical direction Dv is defined as Cv, Ch and Cv are represented by the following formulas (1) and (2) respectively.

$$Ch=\text{Abs}(2\times R22-R02-R42)+\text{Abs}(G12-G32) \quad (1)$$

$$Cv=\text{Abs}(2\times R22-R20-R24)+\text{Abs}(G21-G23) \quad (2)$$

where Abs in the respective formulas (1) and (2) represents a function for obtaining an absolute value. The same definition is applied to the following formulas described below.

When Ch<Cv, the horizontal direction Dh has a larger correlation. In this case, the G interpolation direction selector 20 outputs selection data indicating the horizontal direction so that the G interpolation unit 40 performs the interpolation processing in the horizontal direction.

When Ch>Cv, the vertical direction Dv has a larger correlation. In this case, the G interpolation direction selector 20 outputs selection data indicating the vertical direction so that the G interpolation unit 40 performs the interpolation processing in the vertical direction.

When Ch=Cv, the G interpolation direction selector 20 outputs selection data indicating Ch=Cv so that the G interpolation unit 40 uses, as the interpolation pixel signal, a value obtained by averaging an interpolation value in the horizontal direction and an interpolation value in the vertical direction.

Figure 3B:
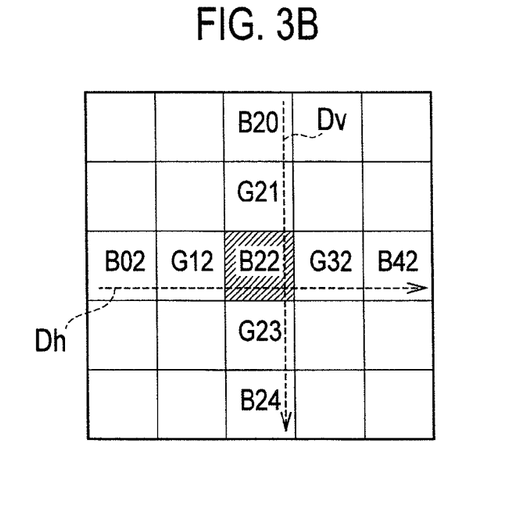
FIG. 3B is a view showing pixel signals of R, G and B used for performing interpolation of a pixel signal of G in a position of a pixel signal of B.

As shown in FIG. 3B, the G interpolation direction selector 20 determines whether the horizontal direction Dh or the vertical direction Dv has a larger correlation so that the G interpolation unit 40 produces the interpolation pixel signal of G in the pixel position of B indicated by B22. The amount of change Ch in the horizontal direction Dh and the amount of change Cv in the vertical direction Dv are represented by the following formulas (3) and (4) respectively.

$$Ch=\text{Abs}(2\times B22-B02-B42)+\text{Abs}(G12-G32) \quad (3)$$

$$Cv=\text{Abs}(2\times B22-R20-R24)+\text{Abs}(G21-G23) \quad (4)$$

When Ch<Cv, the horizontal direction Dh has a larger correlation. In this case, the G interpolation direction selector 20 outputs selection data indicating the horizontal direction so that the G interpolation unit 40 performs the interpolation processing in the horizontal direction.

When Ch>Cv, the vertical direction Dv has a larger correlation. In this case, the G interpolation direction selector 20 outputs selection data indicating the vertical direction so that the G interpolation unit 40 performs the interpolation processing in the vertical direction.

When Ch=Cv, the G interpolation direction selector 20 outputs selection data indicating Ch=Cv so that the G interpolation unit 40 uses, as the interpolation pixel signal, a value obtained by averaging an interpolation value in the horizontal direction and an interpolation value in the vertical direction.

As shown in FIGS. 3A and 3B, when the hatched pixel of R indicated by R22 or the hatched pixel of B indicated by B22 is a target pixel, the pixel signals of R, G and B shown in FIG. 3A and FIG. 3B are input into the G interpolation direction selector 20, the G interpolation method selector 30 and the G interpolation unit 40. The pixel delay unit 10 supplies the pixel signals of R, G and B shown in FIG. 3A and FIG. 3B to the G interpolation direction selector 20, the G interpolation method selector 30 and the G interpolation unit 40.

The selection data output from the G interpolation direction selector 20 is input into the G interpolation method selector 30. Although based on the interpolation of the pixel signals by the ACPI method in the image signal processing device and method according to the present embodiment, interpolation pixel signals are produced by another interpolation method different from the ACPI method under predetermined conditions. The G interpolation method selector 30 selects an interpolation method. The interpolation method different from the ACPI method and the selection of the interpolation method by the G interpolation method selector 30 will be explained in detail below.

The G interpolation unit 40 produces the interpolation pixel signals of G in each of the pixel position of R and the pixel position of B based on the selection data output from the G interpolation direction selector 20 and the interpolation method selected by the G interpolation method selector 30.

In terms only of the ACPI method, the G interpolation unit 40 produces the interpolation pixel signals of G in each of the pixel position of R and the pixel position of B according to the following formulas (5) and (6).

Here, R02, R22 and R42 or R20, R22 and R24 in FIG. 3A are defined as R0, R2 and R4. G12 and G32 or G21 and G23 in FIG. 3A are defined as G1 and G3. B02, B22 and B42 or B20, B22 and B24 in FIG. 3B are defined as B0, B2 and B4. G12 and G32 or G21 and G23 in FIG. 3B are defined as G1 and G3. The interpolation pixel signal of G in the pixel position of R indicated by R22 is defined as G^2.

$$G\hat{}2=(G1+G3)/2+\{R2-(R0+R4)/2\}/2 \quad (5)$$

$$G\hat{}2=(G1+G3)/2+\{B2-(B0+B4)/2\}/2 \quad (6)$$

Figure 4A:
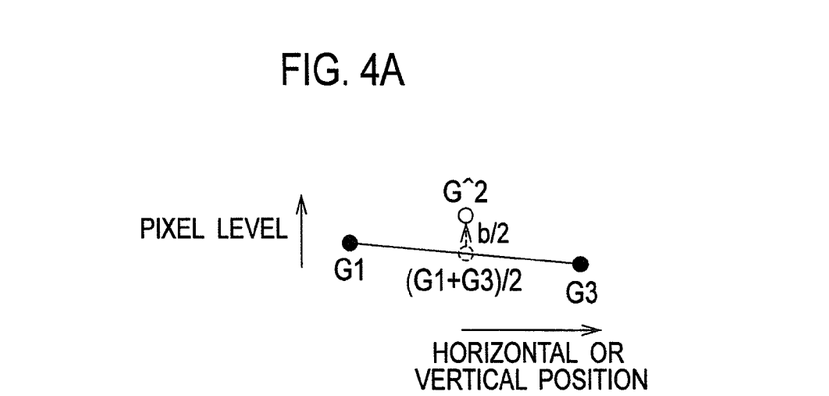
FIGS. 4A and 4B are views schematically showing interpolation processing performed on the pixel signal of G in the position of the pixel signal of R by an ACPI method.
Figure 4B:
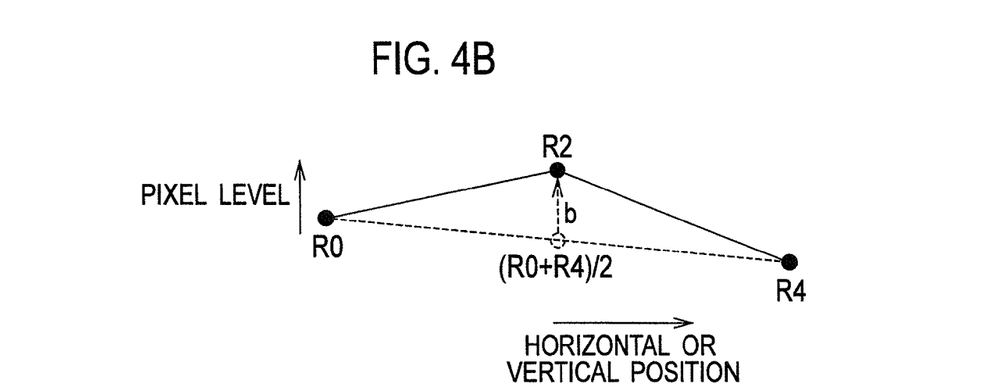

As shown in FIG. 4A and FIG. 4B, the formula (5) shows that b/2, which is a half of a difference b between R2 and an average value of R0 and R4, is equal to a difference between the interpolation pixel signal G^2 and an average value of G1 and G3. Although not particularly shown in the figure, the same definition is also applied to the formula (6).

When the G interpolation unit 40 produces the interpolation pixel signal of G, pixel signals of three pixels in the pixel signals of R or B used as reference signals are set to first to third pixel signals of R or B (R0, R2 and R4 or B0, B2 and B4) in order of time. Pixel signals of three pixels which are the interpolation pixel signal of G and two pixel signals of G interposing the interpolation pixel signal of G, are set to first to third pixel signals of G (G1, G^2, G3) in order of time.

The G interpolation unit 40 produces the interpolation pixel signal of G (G^2), according to the ACPI method, in such a manner as to add, to an average value of the first pixel signal of G and the third pixel signal of G, a value obtained by multiplying a difference between the second pixel signal of R or B (R2 or B2) and an average value of the first pixel signal of R or B (R0 or B0) and the third pixel signal of R or B (R4 or B4) by a ratio (½ in this case) of a distance between the first pixel signal of G (G1) and the third pixel signal of G (G3) to a distance between the first pixel signal of R or B and the third pixel signal of R or B.

Accordingly, in FIG. 1, the interpolation pixel signals of G in each of the pixel position of R and the pixel position of B produced by the G interpolation unit 40 are input into the R/B interpolation direction selector 50, the R/B interpolation method selector 60 and the R/B interpolation unit 70.

As described below, the R/B interpolation unit 70 produces an interpolation pixel signal of R or B in a pixel position of G, an interpolation pixel signal of B in a pixel position of R, and an interpolation pixel signal of R in a pixel position of B. The R/B interpolation direction selector 50 selects an interpolation direction used at the time of each interpolation processing by the R/B interpolation unit 70.

Figure 5:
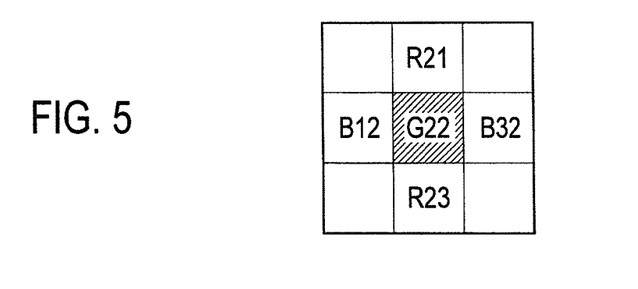
FIG. 5 is a view showing pixel signals of R and B used for performing interpolation of pixel signals of R and B in a position of a pixel signal of G.

As shown in FIG. 5, when the R/B interpolation unit 70 produces the interpolation pixel signal of R in the pixel position of G indicated by G22, the direction to be selected by the R/B interpolation direction selector 50 is necessarily determined uniformly since the pixel signals of R are obviously present in the vertical direction with respect to the pixel position of G. When the R/B interpolation unit 70 produces the interpolation pixel signal of B in the pixel position of G indicated by G22, the direction to be selected by the R/B interpolation direction selector 50 is necessarily determined uniformly since the pixel signals of B are obviously present in the horizontal direction with respect to the pixel position of G.

Therefore, the R/B interpolation direction selector 50 outputs selection data indicating the vertical direction when the R/B interpolation unit 70 produces the interpolation pixel signal of R in the pixel position of G, and outputs selection data indicating the horizontal direction when the R/B interpolation unit 70 produces the interpolation pixel signal of B in the pixel position of G.

As shown in FIG. 5, when the hatched pixel of G indicated by G22 is a target pixel, the pixel signals of R, G and B shown in FIG. 5 are input into the R/B interpolation direction selector 50, the R/B interpolation method selector 60 and the R/B interpolation unit 70. The pixel delay unit 10 supplies the pixel signals of R, G and B shown in FIG. 5 to the R/B interpolation direction selector 50, the R/B interpolation method selector 60 and the R/B interpolation unit 70.

The selection data output from the R/B interpolation direction selector 50 is input into the R/B interpolation method selector 60. The R/B interpolation method selector 60 selects an interpolation method. The R/B interpolation unit 70 produces the interpolation pixel signal of R or B in the pixel position of G based on the selection data output from the R/B interpolation direction selector 50 and the interpolation method selected by the R/B interpolation method selector 60.

In terms only of the ACPI method, the R/B interpolation unit 70 produces the respective interpolation pixel signals of R and B in the pixel position of G according to the following formulas (7) and (8).

Figure 6:
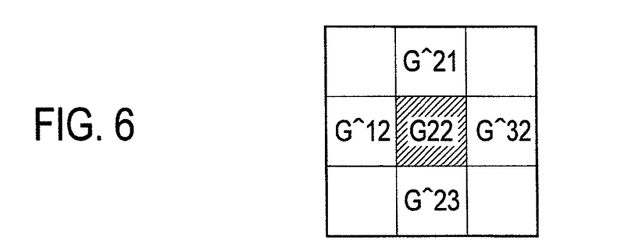
FIG. 6 is a view showing a pixel signal of G and an interpolation pixel signal of G used for performing interpolation of the pixel signals of R and B in the position of the pixel signal of G.

Here, G22 in FIG. 5 is defined as G2. R21 and R23 in FIG. 5 are defined as R1 and R3. B12 and B32 in FIG. 5 are defined as B1 and B3. The interpolation pixel signals of G in the pixel positions of R21, R23, B12 and B32 in FIG. 5 are defined as G^21, G^23, G^12 and G^32 respectively as shown in FIG. 6. G^12 and G^32 or G^21 and G^23 in FIG. 6 are defined as G^1 and G^3.

$$R\hat{}2=(R1+R3)/2+\{G2-(G\hat{}1+G\hat{}3)/2\} \quad (7)$$

$$B\hat{}2=(B1+B3)/2+\{G2-(G\hat{}1+G\hat{}3)/2\} \quad (8)$$

Figure 7A:
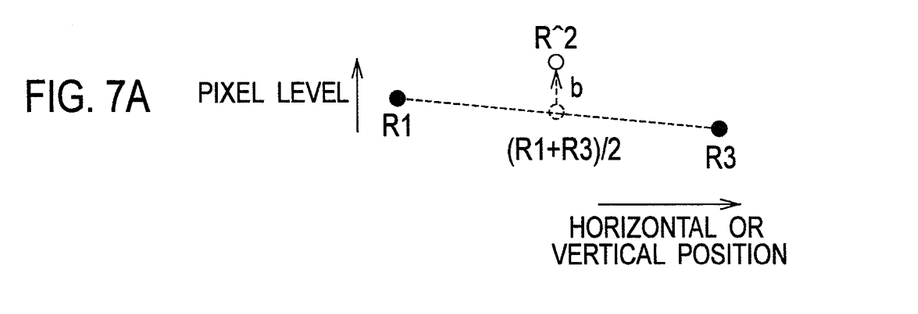
FIGS. 7A and 7B are views schematically showing interpolation processing performed on a pixel signal of R in the position of the pixel signal of G by the ACPI method.
Figure 7B:
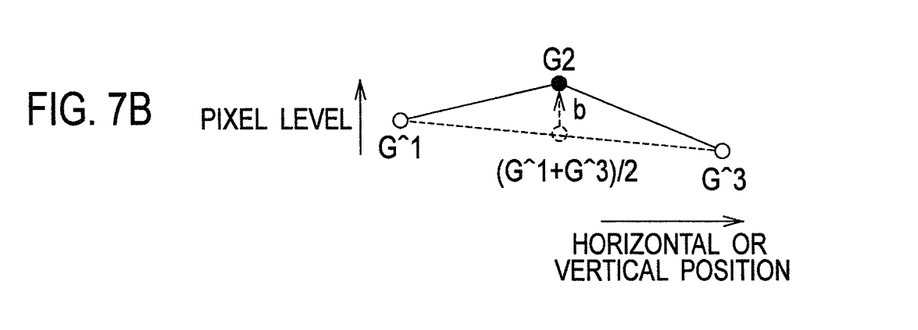

As shown in FIG. 7A and FIG. 7B, the formula (7) shows that a difference b between G2 and an average value of G^1 and G^3 is equal to a difference between the interpolation pixel signal R^2 and an average value of R1 and R3. Although not particularly shown in the figure, the same definition is also applied to the formula (8).

Pixel signals of three pixels in the pixel signals of G or in the interpolation pixel signals of G as reference signals used for producing the interpolation pixel signal of R or B, are set to fourth to sixth pixel signals of G (G^1, G2, G^3) in order of time. Pixel signals of three pixels which are the interpolation pixel signal of R or B and two pixel signals of R or B interposing the interpolation pixel signal of R or B, are set to fourth to sixth pixel signals of R or B (R1, R^2, R3 or B1, B^2, B3) in order of time.

The R/B interpolation unit 70 produces the interpolation pixel signal of R or B (R^2 or B^2), according to the ACPI method, in such a manner as to add a difference between the fifth pixel signal of G (G2) and an average value of the fourth pixel signal of G (G^1) and the sixth pixel signal of G (G^3) to an average value of the fourth pixel signal of R or B (R1 or B1) and the sixth pixel signal of R or B (R3 or B3).

Figure 8:
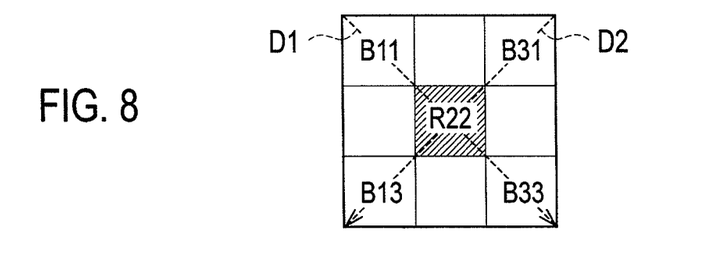
FIG. 8 is a view showing a pixel signal of B used for performing interpolation of a pixel signal of B in a position of a pixel signal of R.

As shown in FIG. 8, the R/B interpolation direction selector 50 determines whether an upper left-lower right direction D1 or an upper right-lower left direction D2 has a larger correlation so that the R/B interpolation unit 70 produces the interpolation pixel signal of G in the pixel position of R indicated by R22. When the amount of change in the upper left-lower right direction D1 is defined as C1 and the amount of change in the upper right-lower left direction D2 is defined as C2, C1 and C2 are represented by the following formulas (9) and (10) respectively.

Figure 9:
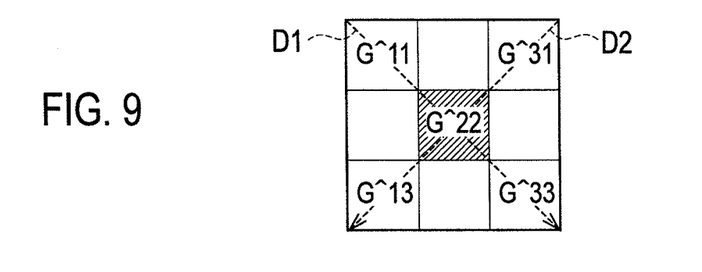
FIG. 9 is a view showing an interpolation pixel signal of G used for performing interpolation of the pixel signal of B in the position of the pixel signal of R.

The interpolation pixel signals of G in the pixel positions of B11, B31, B13 and B33 in FIG. 8 are defined as G^11, G^31, G^13 and G^33 respectively as shown in FIG. 9.

$$C1 = \text{Abs}(2 \times G\hat{\ }22 - G\hat{\ }11 - G\hat{\ }33) + \text{Abs}(B11 - B33) \quad (9)$$

$$C2 = \text{Abs}(2 \times G\hat{\ }22 - G\hat{\ }13 - G\hat{\ }31) + \text{Abs}(B13 - B31) \quad (10)$$

When C1<C2, the upper left-lower right direction D1 has a larger correlation. In this case, the R/B interpolation direction selector 50 outputs selection data indicating the upper left-lower right direction D1 so that the R/B interpolation unit 70 performs the interpolation processing in the upper left-lower right direction D1.

When C1>C2, the upper right-lower left direction D2 has a larger correlation. In this case, the R/B interpolation direction selector 50 outputs selection data indicating the upper right-lower left direction D2 so that the R/B interpolation unit 70 performs the interpolation processing in the upper right-lower left direction D2.

When C1=C2, the R/B interpolation direction selector 50 outputs selection data indicating C1=C2 so that the R/B interpolation unit 70 uses, as the interpolation pixel signal, a value obtained by averaging an interpolation value by the interpolation processing in the upper left-lower right direction D1 and an interpolation value by the interpolation processing in the upper right-lower left direction D2.

As shown in FIG. 8, the hatched pixel of R indicated by R22 is a target pixel, the pixel signals of B shown in FIG. 8 and the interpolation pixel signals of G shown in FIG. 9 are input into the R/B interpolation direction selector 50, the R/B interpolation method selector 60 and the R/B interpolation unit 70.

The pixel delay unit 10 supplies the pixel signals of B shown in FIG. 8 to the R/B interpolation direction selector 50, the R/B interpolation method selector 60 and the R/B interpolation unit 70. The G interpolation unit 40 supplies the interpolation pixel signals of G shown in FIG. 9 to the R/B interpolation direction selector 50, the R/B interpolation method selector 60 and the R/B interpolation unit 70.

The selection data output from the R/B interpolation direction selector 50 is input into the R/B interpolation method selector 60. The R/B interpolation method selector 60 selects an interpolation method. The R/B interpolation unit 70 produces the interpolation pixel signal of B in the pixel position of R based on the selection data output from the R/B interpolation direction selector 50 and the interpolation method selected by the R/B interpolation method selector 60.

In terms only of the ACPI method, the R/B interpolation unit 70 produces the interpolation pixel signal of B in the pixel position of R according to the following formula (11). B11 and B33 or B31 and B13 in FIG. 8 are defined as B1 and B3. G^22 in FIG. 9 is defined as G^2. G^11 and G^33 or G^31 and G^13 in FIG. 9 are defined as G^1 and G^3.

$$B\hat{\ }2 = (B1 + B3)/2 + \{G\hat{\ }2 - (G\hat{\ }1 + G\hat{\ }3)/2\} \quad (11)$$

Figure 10A:
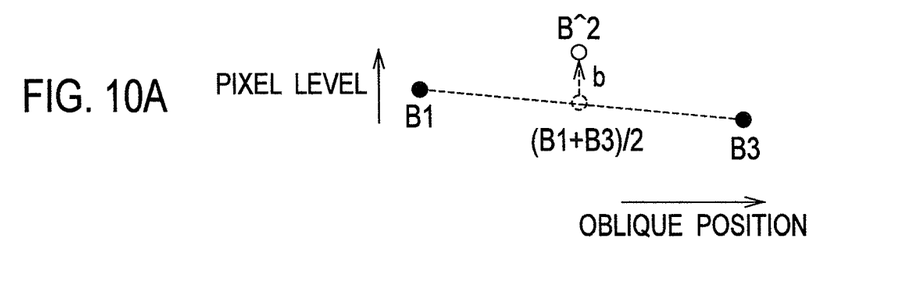
FIGS. 10A and 10B are views schematically showing interpolation processing performed on the pixel signal of B in the position of the pixel signal of R by the ACPI method.
Figure 10B:
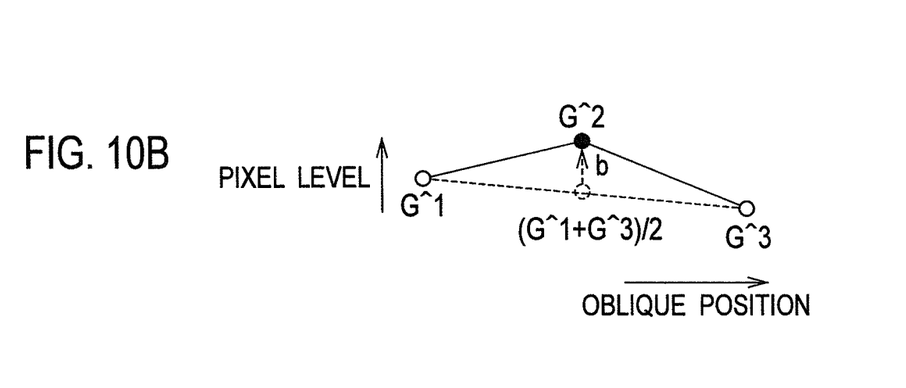

As shown in FIG. 10A and FIG. 10B, the formula (11) shows that a difference b between G^2 and an average value of G^1 and G^3 is equal to a difference between the interpolation pixel signal B^2 and an average value of B1 and B3.

As in the case described above, pixel signals of three pixels in the interpolation pixel signals of G as reference signals used for producing the interpolation pixel signal of B are set to fourth to sixth pixel signals of G (G^1, G^2, G^3) in order of time. Pixel signals of three pixels which are the interpolation pixel signal of B and two pixel signals of B interposing the interpolation pixel signal of B, are set to fourth to sixth pixel signals of B (B1, B^2, B3) in order of time.

The R/B interpolation unit 70 produces the interpolation pixel signal of B (B^2), according to the ACPI method, in such a manner as to add a difference between the fifth pixel signal of G (G^2) and an average value of the fourth pixel signal of G (G^1) and the sixth pixel signal of G (G^3) to an average value of the fourth pixel signal of B (B1) and the sixth pixel signal of B (B3).

Figure 11:
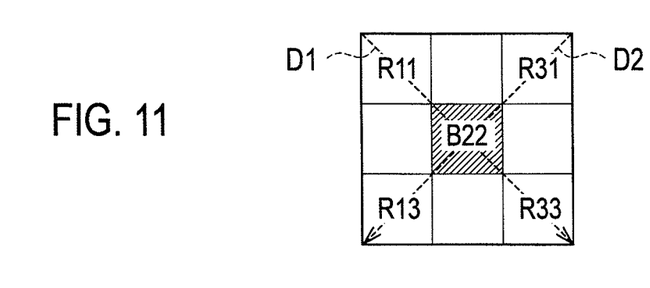
FIG. 11 is a view showing a pixel signal of R used for performing interpolation of a pixel signal of R in a position of a pixel signal of B.

As shown in FIG. 11, the R/B interpolation direction selector 50 determines whether the upper left-lower right direction D1 or the upper right-lower left direction D2 has a larger correlation so that the R/B interpolation unit 70 produces the interpolation pixel signal of R in the pixel position of B indicated by B22. The amount of change C1 in the upper left-lower right direction D1 and the amount of change C2 in the upper right-lower left direction D2 are represented by the following formulas (12) and (13) respectively.

Figure 12:
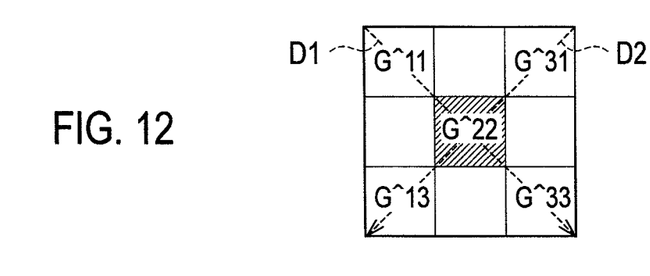
FIG. 12 is a view showing an interpolation pixel signal of G used for performing interpolation of the pixel signal of R in the position of the pixel signal of B.

The interpolation pixel signals of G in the pixel positions of R11, R31, R13 and R33 shown in FIG. 11 are defined as G^11, G^31, G^13 and G^33 respectively as shown in FIG. 12.

$$C1 = \text{Abs}(2 \times G\hat{\ }22 - G\hat{\ }11 - G\hat{\ }33) + \text{Abs}(R11 - R33) \quad (12)$$

$$C2 = \text{Abs}(2 \times G\hat{\ }22 - G\hat{\ }13 - G\hat{\ }31) + \text{Abs}(R12 - R31) \quad (13)$$

When C1<C2, the upper left-lower right direction D1 has a larger correlation. In this case, the R/B interpolation direction selector 50 outputs selection data indicating the upper left-lower right direction D1 so that the R/B interpolation unit 70 performs the interpolation processing in the upper left-lower right direction D1.

When C1>C2, the upper right-lower left direction D2 has a larger correlation. In this case, the R/B interpolation direction selector 50 outputs selection data indicating the upper right-lower left direction D2 so that the R/B interpolation unit 70 performs the interpolation processing in the upper right-lower left direction D2.

When C1=C2, the R/B interpolation direction selector 50 outputs selection data indicating C1=C2 so that the R/B interpolation unit 70 uses, as the interpolation pixel signal, a value obtained by averaging an interpolation value by the interpolation processing in the upper left-lower right direction D1 and an interpolation value by the interpolation processing in the upper right-lower left direction D2.

As shown in FIG. 11, the hatched pixel of B indicated by B22 is a target pixel, the pixel signals of R shown in FIG. 11 and the interpolation pixel signals of G shown in FIG. 12 are input into the R/B interpolation direction selector 50, the R/B interpolation method selector 60 and the R/B interpolation unit 70.

The pixel delay unit 10 supplies the pixel signals of R shown in FIG. 11 to the R/B interpolation direction selector 50, the R/B interpolation method selector 60 and the R/B interpolation unit 70. The G interpolation unit 40 supplies the interpolation pixel signals of G shown in FIG. 12 to the R/B interpolation direction selector 50, the R/B interpolation method selector 60 and the R/B interpolation unit 70.

The selection data output from the R/B interpolation direction selector 50 is input into the R/B interpolation method selector 60. The R/B interpolation method selector 60 selects an interpolation method. The R/B interpolation unit 70 produces the interpolation pixel signal of R in the pixel position of B based on the selection data output from the R/B interpolation direction selector 50 and the interpolation method selected by the R/B interpolation method selector 60.

In terms only of the ACPI method, the R/B interpolation unit 70 produces the interpolation pixel signal of R in the pixel position of B according to the following formula (14). R11 and R33 or R31 and R13 in FIG. 11 are defined as R1 and R3. G^22 in FIG. 12 is defined as G^2. G^11 and G^33 or G^31 and G^13 in FIG. 12 are defined as G^1 and G^3.

$$R\hat{}2=(R1+R3)/2+\{G\hat{}2-(G\hat{}1+G\hat{}3)/2\} \quad (14)$$

Figure 13A:
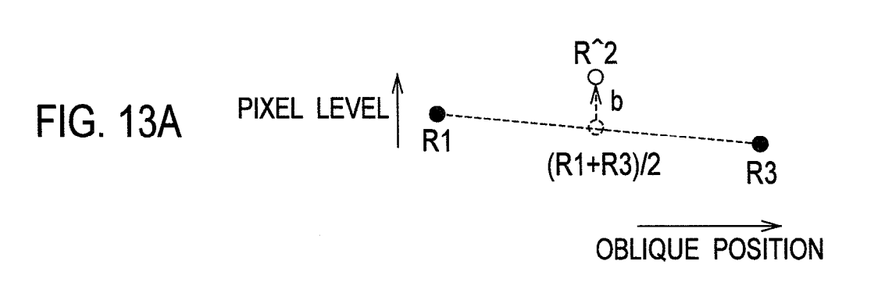
FIGS. 13A and 13B are views schematically showing interpolation processing performed on the pixel signal of R in a position of a pixel signal of G by the ACPI method.
Figure 13B:
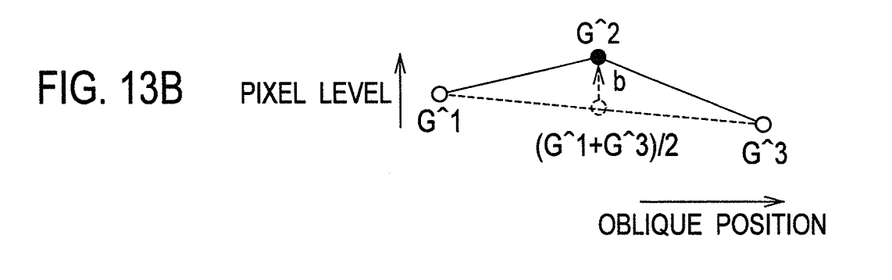

As shown in FIG. 13A and FIG. 13B, the formula (14) shows that a difference b between G^2 and an average value of G^1 and G^3 is equal to a difference between the interpolation pixel signal R^2 and an average value of R1 and R3.

As in the case described above, pixel signals of three pixels in the interpolation pixel signals of G as reference signals used for producing the interpolation pixel signal of R are set to fourth to sixth pixel signals of G (G^1, G^2, G^3) in order of time. Pixel signals of three pixels which are the interpolation pixel signal of R and two pixel signals of R interposing the interpolation pixel signal of R, are set to fourth to sixth pixel signals of R (R1, R^2, R3) in order of time.

The R/B interpolation unit 70 produces the interpolation pixel signal of R (R^2), according to the ACPI method, in such a manner as to add a difference between the fifth pixel signal of G (G^2) and an average value of the fourth pixel signal of G (G^1) and the sixth pixel signal of G (G^3) to an average value of the fourth pixel signal of R (R1) and the sixth pixel signal of R (R3).

The following is an example of how the ACPI method is improved. While based on the production of interpolation pixel signals by the ACPI method, the image signal processing device and method according to the present embodiment produce interpolation pixel signals by an ACPI method obtained by improving the above-described ACPI method under predetermined conditions. Hereinafter, the improved ACPI method is referred to as an advanced adaptive color plane interpolation (AACPI) method.

Figure 14A:
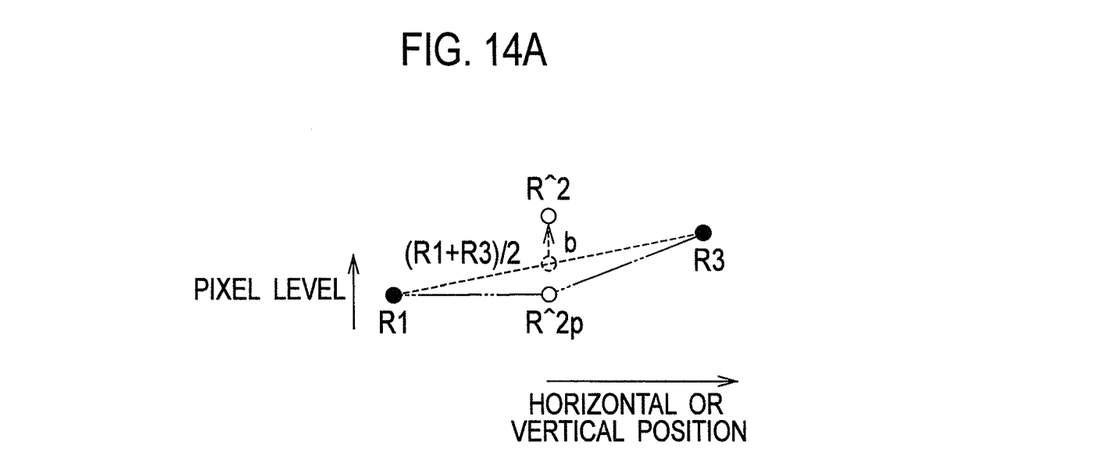
FIGS. 14A and 14B are views each showing an example in which a fault is caused by interpolation processing by the ACPI method.
Figure 14B:
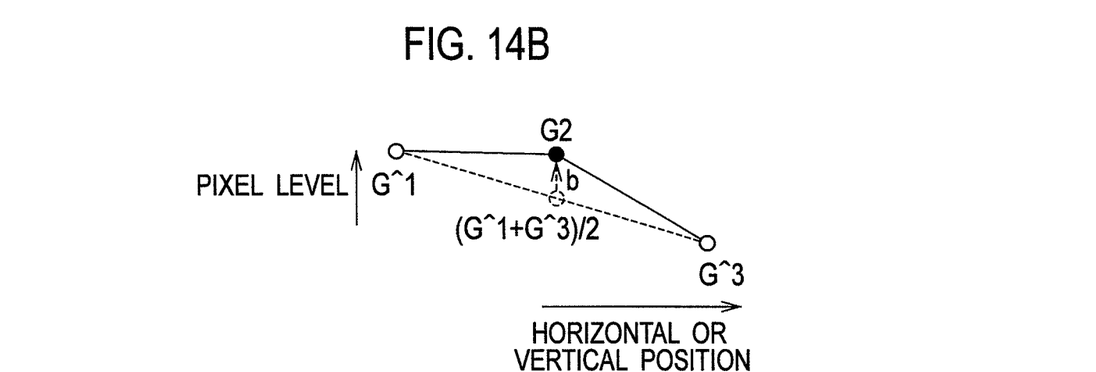

FIG. 14A and FIG. 14B each show a case, as in the case of FIG. 7A and FIG. 7B, where the interpolation pixel signal of R (R^2) between the pixel signals of R (R1 and R3) is produced using the pixel signal of G (G2) and the interpolation pixel signals of G (G^1 and G^3) as reference signals. In FIG. 14B, the interpolation pixel signal G^1 has substantially the same pixel level as the pixel signal G2, and the interpolation pixel signal G^3 has a smaller pixel level than each of the interpolation pixel signal G^1 and the pixel signal G2.

In the interpolation by the above-described ACPI method, the interpolation pixel signal R^2 has a larger pixel level than an average value of the pixel signals R1 and R3 as shown in FIG. 14A. In FIG. 14B, however, the interpolation pixel signal G^1 and the pixel signal G2 show a flat line, and the pixel level changes from the pixel signal G2 to the interpolation pixel signal G^3. Therefore, edges of the image are conceived to be present between the pixel signal G2 and the interpolation pixel signal G^3.

As shown in FIG. 14A, when the interpolation pixel signal R^2 is produced by the ACPI method, edges of the image in the pixel signals of R are present between the pixel signal R1 and the interpolation pixel signal R^2. Thus, the edges of the image in the pixel signals of R do not conform to the edges of the image in the pixel signals of G, which results in deterioration in image quality.

The G interpolation method selector 30 and the R/B interpolation method selector 60 each observe how the pixel signals change (including the interpolation pixel signals, the same applies hereafter), which are used as reference signals for producing the respective interpolation pixel signals, so as to determine whether to adopt the ACPI method or the AACPI method as an additional interpolation method.

Figure 15A:
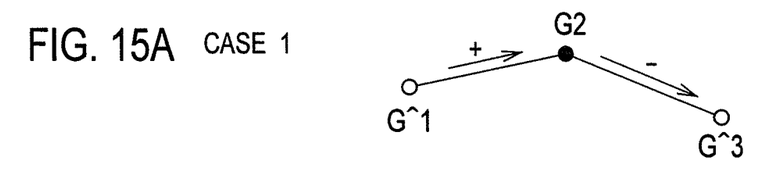
FIGS. 15A to 15D are views showing case definitions depending on increase-decrease conditions of three pixel signals in reference pixel signals.

FIG. 15A to FIG. 15D each show a case where the reference pixel signals are the pixel signals of G. FIG. 15A is a pattern in which the pixel level increases from the interpolation pixel signal G^1 to the pixel signal G2, and the pixel level decreases from the pixel signal G2 to the interpolation pixel signal G^3. The G interpolation method selector 30 and the R/B interpolation method selector 60 define the increase-decrease pattern of the reference pixel signals as case 1.

Figure 15B:
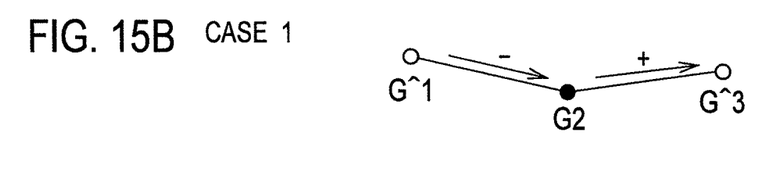

FIG. 15B is a pattern in which the pixel level decreases from the interpolation pixel signal G^1 to the pixel signal G2, and the pixel level increases from the pixel signal G2 to the interpolation pixel signal G^3. The G interpolation method selector 30 and the R/B interpolation method selector 60 define the decrease-increase pattern of the reference pixel signals also as case 1.

Figure 15C:
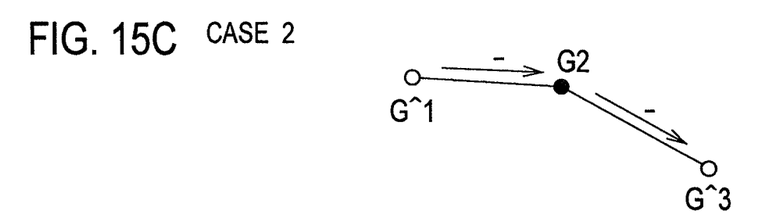

FIG. 15C is a monotonous decrease pattern in which the pixel level decreases from the interpolation pixel signal G^1 to the pixel signal G2, and the pixel level further decreases from the pixel signal G2 to the interpolation pixel signal G^3. The G interpolation method selector 30 and the R/B interpolation method selector 60 define the monotonous decrease pattern of the reference pixel signals as case 2.

Figure 15D:
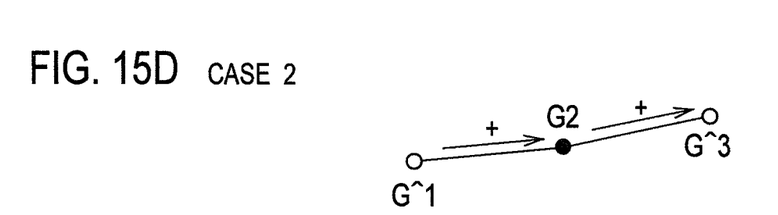

FIG. 15D is a monotonous increase pattern in which the pixel level increases from the interpolation pixel signal G^1 to the pixel signal G2, and the pixel level further increases from the pixel signal G2 to the interpolation pixel signal G^3. The G interpolation method selector 30 and the R/B interpolation method selector 60 the monotonous increase pattern of the reference pixel signals also as case 2.

The same definitions of case 1 and case 2 are applied to the case where the reference pixel signals are the pixel signals of R or the pixel signals of B.

When the G interpolation method selector 30 and the R/B interpolation method selector 60 determine the changing pattern of the reference pixel signals as case 1, the respective selectors 30 and 60 supply a first instruction signal for performing interpolation by the ACPI method to the G interpolation unit 40 and the R/B interpolation unit 70 respectively, so that the G interpolation unit 40 and the R/B interpolation unit 70 produce the respective interpolation pixel signals by the above-described ACPI method.

When the G interpolation method selector 30 and the R/B interpolation method selector 60 determine the changing pattern of the reference pixel signals as case 2, the respective selectors 30 and 60 supply a second instruction signal for performing interpolation by the AACPI method as an additional interpolation method to the G interpolation unit 40 and the R/B interpolation unit 70 respectively, so that the G interpolation unit 40 and the R/B interpolation unit 70 produce the respective interpolation pixel signals by the AACPI method.

The G interpolation method selector 30 serves as a first determination unit that determines whether the changing pattern of the pixel level of the first to third R/B pixel signals as reference signals used for producing the interpolation pixel signal of G, is the first case or the second case.

The R/B interpolation method selector 60 serves as a second determination unit that determines whether the changing pattern of the pixel level of the fourth to sixth G pixel signals as reference signals used for producing the interpolation pixel signal of R or B, is the first case or the second case.

The following is an explanation of the AACPI method as an additional interpolation method that the G interpolation unit 40 and the R/B interpolation unit 70 use.

In the case of producing the interpolation pixel signal of G in the pixel position of R indicated by R22 and the interpolation pixel signal of G in the pixel position of B indicated by B22 in FIG. 3A and FIG. 3B, the G interpolation unit 40 uses the following formulas (15) and (16), instead of the formulas (5) and (6), when the G interpolation method selector 30 supplies the second instruction signal.

When the G interpolation unit 40 produces the interpolation pixel signal of G using the pixel signals of R as reference signals, the G interpolation unit 40 produces the interpolation pixel signal G^2 according to the formula (15) in a manner such that a change ratio of the change from the pixel signal R0 to the pixel signal R2 to the change from the pixel signal R2 to the pixel signal R4, is equal to a change ratio of the change from the pixel signal G1 to the interpolation pixel signal G^2 to the change from the interpolation pixel signal G^2 to the pixel signal G3.

$$G\char`^2=\{G1\times(R2-R0)+G3\times(R2-R4)\}/(R0-R4) \quad (15)$$

The G interpolation unit 40 produces the interpolation pixel signal G^2 according to the formula (16) so that the respective change ratios conform to each other when the G interpolation unit 40 produces the interpolation pixel signal of G using the pixel signals of B as reference signals as in the case described above.

$$G\char`^2=\{G1\times(B2-B0)+G3\times(B2-B4)\}/(B0-B4) \quad (16)$$

The production of the interpolation pixel signals G^2 by the G interpolation unit 40 according to the formulas (15) and (16) means that the interpolation pixel signals of G are produced in a manner such that the shape obtained by connecting the respective pixel positions of the first to third R/B pixel signals resembles the shape obtained by connecting the respective pixel positions of the first to third G pixel signals.

In the case of producing each of the interpolation pixel signal of R and the interpolation pixel signal of B in the pixel position of G indicated by G22 in FIG. 5, the R/B interpolation unit 70 uses the following formulas (17) and (18), instead of the formulas (7) and (8), when the R/B interpolation method selector 60 supplies the second instruction signal.

When the R/B interpolation unit 70 produces the interpolation pixel signal of R using the pixel signal of G and the interpolation pixel signals of G as reference signals, the R/B interpolation unit 70 produces the interpolation pixel signal R^2 according to the formula (17) in a manner such that a change ratio of the change from the interpolation pixel signal G^1 to the pixel signal G2 to the change from the pixel signal G2 to the interpolation pixel signal G^3, is equal to a change ratio of the change from the pixel signal R1 to the interpolation pixel signal R^2 to the change from the interpolation pixel signal R^2 to the pixel signal R3.

$$R\char`^2=\{R1\times(G2-G\char`^1)+R3\times(G2-G\char`^3)\}/(G\char`^1-G\char`^3) \quad (17)$$

The R/B interpolation unit 70 produces the interpolation pixel signal B^2 according to the formula (18) so that the respective change ratios conform to each other when the R/B interpolation unit 70 produces the interpolation pixel signal of B using the pixel signal of G and the interpolation pixel signals of G as reference signals as in the case described above.

$$B\char`^2=\{B1\times(G2-G\char`^1)+B3\times(G2-G\char`^3)\}/(G\char`^1-G\char`^3) \quad (18)$$

The production of the interpolation pixel signals R^2 and B^2 by the R/B interpolation unit 70 according to the formulas (17) and (18) means that the interpolation pixel signals of R and B are produced in a manner such that the shape obtained by connecting the respective pixel positions of the first to third G pixel signals resembles the shape obtained by connecting the respective pixel positions of the first to third R/B pixel signals.

The R/B interpolation unit 70 produces the interpolation pixel signal B^2 according to the following formula (19), instead of the formula (11), so that the respective change ratios conform to each other when the R/B interpolation unit 70 produces the interpolation pixel signal of B in the pixel position of R indicated by R22 in FIG. 8 and when the R/B interpolation method selector 60 supplies the second instruction signal.

$$B\char`^2=\{B1\times(G\char`^2-G\char`^1)+B3\times(G\char`^2-G\char`^3)\}/(G\char`^1-G\char`^3) \quad (19)$$

The production of the interpolation pixel signal B^2 by the R/B interpolation unit 70 according to the formula (19) means that the interpolation pixel signal of B is produced in a manner such that the shape obtained by connecting the respective pixel positions of the first to third G pixel signals resembles the shape obtained by connecting the respective pixel positions of the first to third B pixel signals.

The R/B interpolation unit 70 produces the interpolation pixel signal R^2 according to the following formula (20), instead of the formula (14), so that the respective change ratios conform to each other when the R/B interpolation unit 70 produces the interpolation pixel signal of R in the pixel position of B indicated by B22 in FIG. 11 and when the R/B interpolation method selector 60 supplies the second instruction signal.

$$R\char`^2=\{R1\times(G\char`^2-G\char`^1)+R3\times(G\char`^2-G\char`^3)\}/(G\char`^1-G\char`^3) \quad (20)$$

The production of the interpolation pixel signal R^2 by the R/B interpolation unit 70 according to the formula (20) means that the interpolation pixel signal of R is produced in a manner such that the shape obtained by connecting the respective pixel positions of the first to third G pixel signals resembles the shape obtained by connecting the respective pixel positions of the first to third R pixel signals.

As described above, the G interpolation unit 40 and the R/B interpolation unit 70 adopt the AACPI method as an additional interpolation method represented by the formulas (15) to (20) when the changing pattern of the pixel level of the reference pixel signals is determined as case 2.

Therefore, the present embodiment can prevent the edges of the image in the pixel signals of the reference colors from disconforming to the edges of the image in the pixel signal of the color of which the interpolation pixel is to be produced. Accordingly, the present embodiment can highly avoid deterioration in image quality.

Next, a preferable constitution of the G interpolation method selector 30 and the R/B interpolation method selector 60 is explained below.

Even pixel signals having the changing pattern of the pixel level that should be conceived as case 2 may be determined as case 1 because of superimposition of noise. In view of this, the following constitution is preferable in order to decrease incorrect determination. The constitution is explained below with reference to the example in which the reference pixel signals are arranged in order of G^1, G2 and G^3 as shown in FIG. 7B. One of the interpolation pixel signal G^1 and the interpolation pixel signal G^3, which is a larger signal, is defined as an interpolation pixel signal G^x, and the other one, which is a smaller signal, is defined as an interpolation pixel signal G^y. A predetermined threshold value is defined as Th1. The threshold value Th1 is sufficiently larger than the noise level.

The R/B interpolation method selector 60 determines that the changing pattern is case 1 when fulfilling the following formula (21) or (22) and determines that the changing pattern is case 2 when not fulfilling either the formula (21) or (22), regardless of the determination result obtained by the determination of case 1 or case 2 explained with reference to FIG. 15A to FIG. 15D.

$$G2 > G\hat{\ }x + Th1 \qquad (21)$$

$$G2 < G\hat{\ }y - Th1 \qquad (22)$$

The following is an explanation of the generalized case determination including pixel signals of R or B that the G interpolation method selector 30 uses. The G interpolation method selector 30 and the R/B interpolation method selector 60 select case 1 when fulfilling a first condition that the middle pixel signal of the three pixel signals of the reference pixels is larger than a value obtained by adding the threshold value Th1 to a larger pixel signal of either one of the adjacent two pixel signals interposing the middle pixel signal in the horizontal direction, in the vertical direction or in the oblique direction.

The G interpolation method selector 30 and the R/B interpolation method selector 60 select case 1 when fulfilling a second condition that the middle pixel signal is smaller than a value obtained by subtracting the threshold value Th1 from a smaller pixel signal of either one of the adjacent two pixel signals interposing the middle pixel signal in the horizontal direction, in the vertical direction or in the oblique direction.

The G interpolation method selector 30 and the R/B interpolation method selector 60 select case 2 when not fulfilling either the first condition or the second condition.

Next, a further preferable constitution of the G interpolation unit 40 and the R/B interpolation unit 70 is explained below with reference to FIG. 16.

Figure 16:
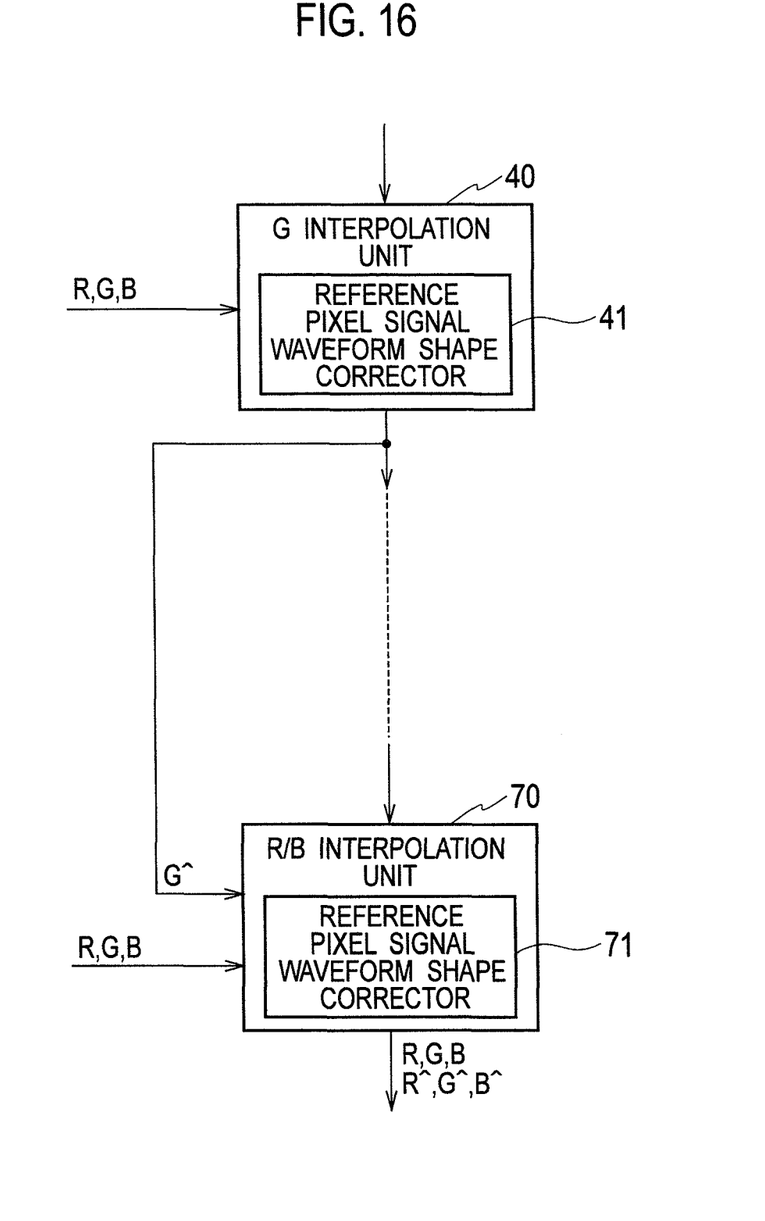
FIG. 16 is a block diagram showing a further preferred configuration example of an image signal processing device according to at least one embodiment.

FIG. 16 shows the G interpolation unit 40 and the R/B interpolation unit 70 omitting the other circuit blocks. In the further preferable constitution example, the G interpolation unit 40 and the R/B interpolation unit 70 include reference pixel signal waveform shape correctors 41 and 71 respectively.

When the amount of change of each of a change from one of the adjacent two pixel signals (for example, the interpolation pixel signal G^1) to the middle pixel signal (for example, the pixel signal G2) and a change from the middle pixel signal to the other one of the adjacent two pixel signals (for example, the interpolation pixel signal G^3), is small, an inaccurate change ratio may be obtained because of an influence of noise.

Thus, the reference pixel signal waveform shape corrector 41 sets a predetermined offset value Ofs so as to obtain an accurate change ratio. The reference pixel signal waveform shape corrector 41 corrects a shape of a waveform of the first to third R/B pixel signals in such a manner as to add the offset value Ofs to each of a difference between the first R/B pixel signal and the second R/B pixel signal and a difference between the second R/B pixel signal and the third R/B pixel signal.

The G interpolation unit 40 produces the interpolation pixel signal of G in a manner such that the corrected shape in which the respective pixel positions of the first to third R/B pixel signals are connected resembles a shape in which the respective pixel positions of the first to third G pixel signals are connected.

The reference pixel signal waveform shape corrector 71 sets a predetermined offset value Ofs so as to obtain an accurate change ratio. The reference pixel signal waveform shape corrector 71 corrects a shape of a waveform of the fourth to sixth G pixel signals in such a manner as to add the offset value Ofs to each of a difference between the fourth G pixel signal and the fifth G pixel signal and a difference between the fifth G pixel signal and the sixth G pixel signal.

The R/B interpolation unit 70 produces the interpolation pixel signal of R or B in a manner such that the corrected shape in which the respective pixel positions of the fourth to sixth G pixel signals are connected resembles the shape in which the respective pixel positions of the fourth to sixth R/B pixel signals are connected.

In particular, the G interpolation unit 40 produces the interpolation pixel signals of G using the following formulas (23) and (24) instead of the formulas (15) and (16). The R/B interpolation unit 70 produces the interpolation pixel signals of R and B using the following formulas (25) to (28) instead of the formulas (17) to (20).

$$G\hat{\ }2 = [G1 \times \{\text{Abs}(R2-R0)+\text{Ofs}\} + G3 \times \{\text{Abs}(R2-R4)+\text{Ofs}\}]/\{\text{Abs}(R2-R0)+\text{Abs}(R2-R4)+2\times\text{Ofs}\} \qquad (23)$$

$$G\hat{\ }2 = [G1 \times \{\text{Abs}(B2-B0)+\text{Ofs}\} + G3 \times \{\text{Abs}(B2-B4)+\text{Ofs}\}]/\{\text{Abs}(B2-B0)+\text{Abs}(B2-B4)+2\times\text{Ofs}\} \qquad (24)$$

$$R\hat{\ }2 = [R1 \times \{\text{Abs}(G2-G\hat{\ }1)+\text{Ofs}\} + R3 \times \{\text{Abs}(G2-G\hat{\ }3)+\text{Ofs}\}]/\{\text{Abs}(G2-G\hat{\ }1)+\text{Abs}(G2-G\hat{\ }3)+2\times\text{Ofs}\} \qquad (25)$$

$$B\hat{\ }2 = [B1 \times \{\text{Abs}(G2-G\hat{\ }1)+\text{Ofs}\} + B3 \times \{\text{Abs}(G2-G\hat{\ }3)+\text{Ofs}\}]/\{\text{Abs}(G2-G\hat{\ }1)+\text{Abs}(G2-G\hat{\ }3)+2\times\text{Ofs}\} \qquad (26)$$

$$B\hat{\ }2 = [B1 \times \{\text{Abs}(G\hat{\ }2-G\hat{\ }1)+\text{Ofs}\} + B3 \times \{\text{Abs}(G\hat{\ }2-G\hat{\ }3)+\text{Ofs}\}]/\{\text{Abs}(G\hat{\ }2-G\hat{\ }1)+\text{Abs}(G\hat{\ }2-G\hat{\ }3)+2\times\text{Ofs}\} \qquad (27)$$

$$R\hat{\ }2 = [R1 \times \{\text{Abs}(G\hat{\ }2-G\hat{\ }1)+\text{Ofs}\} + B3 \times \{\text{Abs}(G\hat{\ }2-G\hat{\ }3)+\text{Ofs}\}]/\{\text{Abs}(G\hat{\ }2-G\hat{\ }1)+\text{Abs}(G\hat{\ }2-G\hat{\ }3)+2\times\text{Ofs}\} \qquad (28)$$

According to the formulas (23) to (28), when the amount of change of each of the change from one of the adjacent two pixel signals to the middle pixel signal and the change from the middle pixel signal to the other one of the adjacent two pixel signals, is small, the interpolation processing is likely to be linear interpolation. When the amount of change is sufficiently larger than the offset value Ofs, the interpolation processing is substantially equivalent to the interpolation according to the formulas (15) to (20).

When the G interpolation unit 40 and the R/B interpolation unit 70 produce the interpolation pixel signals according to the formulas (23) to (28), adverse effects due to noise can be avoided even if the amount of change of the continuous three reference pixel signals is small.

The G interpolation unit 40 and the R/B interpolation unit 70 including the reference pixel signal waveform shape correctors 41 and 71 can produce the interpolation pixel signals according to the formulas (23) to (28) without using the method for determining case 1 or case 2 by the G interpolation method selector 30 and the R/B interpolation method selector 60.

The inventor of the present invention obtained various kinds of images with the imaging apparatus equipped with the imaging device including the color filter of a Bayer array, and performed demosaicing processing on the pixel signals of R, G and B according to the present embodiment so as to verify the effects. The inventor confirmed that interpolation images with high quality having less false noise and jagged oblique edges can be obtained while keeping characteristics of ensuring high resolution and including less false colors in the interpolation processing by the ACPI method even if images include edges of adjacent two colors having a complementary color relationship.

The present invention is not limited to the embodiments described above, and various modifications and improvements can be made without departing from the scope of the present invention.

What is claimed is:

1. An image signal processing device comprising:
a first determination circuit configured to, when pixel signals of three pixels in reference pixel signals of R or B used for producing an interpolation pixel signal of G in a pixel position of a pixel signal of R or B where a pixel signal of G is not present in pixel signals of R, G and B output from an imaging device including a color filter of a Bayer array, are defined as first to third R/B pixel signals in order of time, decide between a first case and a second case, the first case indicating a change including an increase from the first R/B pixel signal to the second R/B pixel signal and a decrease from the second R/B pixel signal to the third R/B pixel signal or a change including a decrease from the first R/B pixel signal to the second R/B pixel signal and an increase from the second R/B pixel signal to the third R/B pixel signal, the second case indicating a monotonous increase or a monotonous decrease of the first to third R/B pixel signals;
a G interpolation circuit configured to, when three pixel signals including the interpolation pixel signal of G and two pixel signals of G interposing the interpolation pixel signal of G therebetween are defined as first to third G pixel signals in order of time, produce the interpolation pixel signal of G in such a manner as to add, to an average value of the first G pixel signal and the third G pixel signal, a value obtained by multiplying a difference between the second R/B pixel signal and an average value of the first R/B pixel signal and the third R/B pixel signal by a ratio of a distance between the first G pixel signal and the third G pixel signal to a distance between the first R/B pixel signal and the third R/B pixel signal when the first determination circuit selects the first case, and produce the interpolation pixel signal of G in a manner such that a shape obtained by connecting each pixel position of the first, second and third R/B pixel signals resembles a shape obtained by connecting each pixel position of the first, second and third G pixel signals when the first determination circuit selects the second case;
a second determination circuit configured to, when pixel signals of three pixels in reference pixel signals of G or reference interpolation pixel signals of G used for producing an interpolation pixel signal of R or B in each of a pixel position of a pixel signal of G where pixel signals of R and B are not present, a pixel position of a pixel signal of R where a pixel signal of B is not present, and a pixel position of a pixel signal of B where a pixel signal of R is not present in the pixel signals of R, G and B output from the imaging device, are defined as fourth to sixth G pixel signals in order of time, decide between the first case and the second case, the first case indicating a change including an increase from the fourth G pixel signal to the fifth G pixel signal and a decrease from the fifth G pixel signal to the sixth G pixel signal or a change including a decrease from the fourth G pixel signal to the fifth G pixel signal and an increase from the fifth G pixel signal to the sixth G pixel signal, the second case indicating a monotonous increase or a monotonous decrease of the fourth to sixth G pixel signals; and
an R/B interpolation circuit configured to, when three pixel signals including the interpolation pixel signal of R or B and two pixel signals of R or B interposing the interpolation pixel signal of R or B therebetween are defined as fourth to sixth R/B pixel signals in order of time, produce the interpolation pixel signal of R or B in such a manner as to add a difference between the fifth G pixel signal and an average value of the fourth G pixel signal and the sixth G pixel signal to an average value of the fourth R/B pixel signal and the sixth R/B pixel signal when the second determination circuit selects the first case, and produce the interpolation pixel signal of R or B in a manner such that a shape obtained by connecting each pixel position of the fourth, fifth and sixth G pixel signals resembles a shape obtained by connecting each pixel position of the fourth, fifth and sixth R/B pixel signals when the second determination circuit selects the second case.

2. The image signal processing device according to claim 1, wherein:
the first determination circuit selects the first case when fulfilling a first condition that the second R/B pixel signal is larger than a value obtained by adding a predetermined threshold value to one of the first R/B pixel signal and the third R/B pixel signal, which is a larger pixel signal, or when fulfilling a second condition that the second R/B pixel signal is smaller than a value obtained by subtracting the predetermined threshold value from one of the first R/B pixel signal and the third R/B pixel signal, which is a smaller pixel signal, and
the first determination circuit selects the second case when not fulfilling either the first condition or the second condition, and the second determination circuit selects the first case when fulfilling the first condition that the fifth G pixel signal is larger than a value obtained by adding a predetermined threshold value to one of the fourth G pixel signal and the sixth G pixel signal, which is a larger pixel signal, or when fulfilling the second condition that the fifth G pixel signal is smaller than a value obtained by subtracting the predetermined threshold value from one of the fourth G pixel signal and the sixth G pixel signal, which is a smaller pixel signal, and the second determination circuit selects the second case when not fulfilling either the first condition or the second condition.

3. The image signal processing device according to claim 1, wherein:
the G interpolation circuit includes a first waveform shape correction circuit configured to correct the shape obtained by connecting the pixel positions of the first, second and third R/B pixel signals in such a manner as to add a predetermined offset value to each of a difference between the first R/B pixel signal and the second R/B pixel signal and a difference between the second R/B pixel signal and the third R/B pixel signal,
the G interpolation circuit produces the interpolation pixel signal of G in a manner such that the shape corrected by the first waveform shape correction circuit resembles the shape obtained by connecting the pixel positions of the first, second and third G pixel signals when the first determination circuit selects the second case,
the R/B interpolation circuit includes a second waveform shape correction circuit configured to correct the shape obtained by connecting the pixel positions of the fourth, fifth and sixth G pixel signals in such a manner as to add a predetermined offset value to each of a difference between the fourth G pixel signal and the fifth G pixel signal and a difference between the fifth G pixel signal and the sixth G pixel signal, and the R/B interpolation circuit produces the interpolation pixel signal of R or B in a manner such that the shape corrected by the second waveform shape correction circuit resembles the shape obtained by connecting the pixel positions of the fourth, fifth and sixth R/B pixel signals when the second determination circuit selects the second case.

4. An image signal processing method comprising:

when pixel signals of three pixels in reference pixel signals of R or B used for producing an interpolation pixel signal of G in a pixel position of a pixel signal of R or B where a pixel signal of G is not present in pixel signals of R, G and B output from an imaging device including a color filter of a Bayer array, are defined as first to third R/B pixel signals in order of time, deciding between a first case and a second case, the first case indicating a change including an increase from the first R/B pixel signal to the second R/B pixel signal and a decrease from the second R/B pixel signal to the third R/B pixel signal or a change including a decrease from the first R/B pixel signal to the second R/B pixel signal and an increase from the second R/B pixel signal to the third R/B pixel signal, the second case indicating a monotonous increase or a monotonous decrease of the first to third R/B pixel signal;

when three pixel signals including the interpolation pixel signal of G and two pixel signals of G interposing the interpolation pixel signal of G therebetween are defined as first to third G pixel signals in order of time, producing the interpolation pixel signal of G in such a manner as to add, to an average value of the first G pixel signal and the third G pixel signal, a value obtained by multiplying a difference between the second R/B pixel signal and an average value of the first R/B pixel signal and the third R/B pixel signal by a ratio of a distance between the first G pixel signal and the third G pixel signal to a distance between the first R/B pixel signal and the third R/B pixel signal when the first case is selected;

producing the interpolation pixel signal of G in a manner such that a shape obtained by connecting each pixel position of the first, second and third R/B pixel signals resembles a shape obtained by connecting each pixel position of the first, second and third G pixel signals when the second case is selected;

when pixel signals of three pixels in reference pixel signals of G or reference interpolation pixel signals of G used for producing an interpolation pixel signal of R or B in each of a pixel position of a pixel signal of G where pixel signals of R and B are not present, a pixel position of a pixel signal of R where a pixel signal of B is not present, and a pixel position of a pixel signal of B where a pixel signal of R is not present in the pixel signals of R, G and B output from the imaging device, are defined as fourth to sixth G pixel signals in order of time, deciding between the first case and the second case, the first case indicating a change including an increase from the fourth G pixel signal to the fifth G pixel signal and a decrease from the fifth G pixel signal to the sixth G pixel signal or a change including a decrease from the fourth G pixel signal to the fifth G pixel signal and an increase from the fifth G pixel signal to the sixth G pixel signal, the second case indicating a monotonous increase or a monotonous decrease of the fourth to sixth G pixel signals;

when three pixel signals including the interpolation pixel signal of R or B and two pixel signals of R or B interposing the interpolation pixel signal of R or B therebetween are defined as fourth to sixth R/B pixel signals in order of time, producing the interpolation pixel signal of R or B in such a manner as to add a difference between the fifth G pixel signal and an average value of the fourth G pixel signal and the sixth G pixel signal to an average value of the fourth R/B pixel signal and the sixth R/B pixel signal when the first case is selected; and producing the interpolation pixel signal of R or B in a manner such that a shape obtained by connecting each pixel position of the fourth, fifth and sixth G pixel signals resembles a shape obtained by connecting each pixel position of the fourth, fifth and sixth R/B pixel signals when the second case is selected.

* * * * *